(12) United States Patent
Gunn, III et al.

(10) Patent No.: US 7,046,896 B1
(45) Date of Patent: May 16, 2006

(54) ACTIVE WAVEGUIDES FOR OPTOELECTRONIC DEVICES

(75) Inventors: Lawrence C. Gunn, III, Encinitas, CA (US); Bing Li, San Diego, CA (US); Thierry J. Pinguet, Cardiff-By-The-Sea, CA (US); David Press, Victory (CA); Maxime Jean Rattier, Paris (FR)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 11/270,785

(22) Filed: Nov. 8, 2005

Related U.S. Application Data

(62) Division of application No. 10/650,234, filed on Aug. 27, 2003.

(60) Provisional application No. 60/406,401, filed on Aug. 27, 2002, provisional application No. 60/406,400, filed on Aug. 27, 2002, provisional application No. 60/406,156, filed on Aug. 27, 2002, provisional application No. 60/406,155, filed on Aug. 27, 2002.

(51) Int. Cl.
*G02B 6/10* (2006.01)
(52) U.S. Cl. .......................................... 385/131; 385/14
(58) Field of Classification Search ................. 385/14, 385/19, 129–132; 65/386; 216/24; 257/458; 372/12, 44, 45, 50
See application file for complete search history.

(56) References Cited

U.S. PATENT DOCUMENTS 6,493,497 B1 * 12/2002 Ramdani et al. ............ 385/131

* cited by examiner

*Primary Examiner*—Phan Palmer
(74) *Attorney, Agent, or Firm*—Femandez & Associates, LLP.

(57) ABSTRACT

Optoelectronic devices of the present invention include several embodiments of an electronically active optical waveguide made of a strip loaded waveguide with a lateral, self-aligned diode fabricated in a layer of silicon. A voltage applied across the diode changes the free carrier density in a portion of the active waveguide, which can change the refractive index in that portion of the waveguide. Changing the refractive index can cause a phase shift of an optical signal propagating down the waveguide and this effect can be used to control the optical signal. Changing the free carrier density can also change the amount of optical attenuation in a section of an active waveguide. Optoelectronic devices such as: modulators, attenuators, switches, beam diverters, tunable filters and other devices can be fabricated on a standard SOI substrate (silicon on insulator), which is typically used in the fabrication of CMOS integrated circuits. Other types of substrates can also be used for the fabrication of optoelectronic devices of the present invention.

23 Claims, 8 Drawing Sheets

| ACTIVE WAVEGUIDE DIODE REGIONS ||||||
|---|---|---|---|---|---|
| REGIONS | DOPANT DENSITY | SIZE OF REGIONS | POLARITY | MASKS for Figs. 1, 2, 3 | MASKS for Fig. 4 |
| Silicon slab | Light (13) | Slab | | None | None |
| 16A | Medium | 16A > 17A | 16A = 17A | SA or External | External |
| 16B | Medium | 16B > 17B | 16B = 17B | SA or External | External |
| 17A | Heavy | | | SA or External | External |
| 17B | Heavy | | | SA or External | External |

FIGURE 8

| ACTIVE WAVEGUIDE DIODES |||
|---|---|---|
| DIODE TYPE | POLARITY OF REGIONS ||
| | 14 | 16A, 17A, 16B, 17B |
| PIN (30A) | None | 16A = 17A ≠ 16B = 17B |
| PNN (30B) | N preferred | 16A = 17A ≠ 16B = 17B |
| DIBL (30C) | N or P | 14 ≠ 16A = 17A = 16B = 17B |

FIGURE 9

ACTIVE WAVEGUIDES FOR OPTOELECTRONIC DEVICES

CROSS-REFERENCE TO RELATED APPLICATIONS

This application is a divisional of application Ser. No. 10/650,234 filed Aug. 27, 2003, which claims priority from U.S. Provisional applications No. 60/406,155 filed Aug. 27, 2002, 60/406,156 filed Aug. 27, 2002, 60/406,400 filed Aug. 27, 2002 and 60/406,401 filed Aug. 27, 2002.

FIELD OF THE INVENTION

The present invention relates to active waveguides for optoelectronic devices in silicon.

BACKGROUND OF THE INVENTION

The rapid expansion in the use of the Internet has resulted in a demand for high speed communications links and devices, including optical links and devices. Optical links using fiber optics have many advantages compared to electrical links: large bandwidth, high noise immunity, reduced power dissipation and minimal crosstalk. Fiber optic communications links can operate with carrier frequencies in the GHz and THz ranges. In communications systems where optical fibers are used to transport optical communications signals, various optoelectronic devices are used to control, Integrated optoelectronic devices made of silicon are highly desirable since they can be fabricated in the same foundries used to make VLSI integrated circuits. Optoelectronic devices integrated with their associated electronic circuits can eliminate the need for more expensive hybrid optoelectronic circuits. Optoelectronic devices built using a standard CMOS process are very desirable and the advantages of such devices include: high yields, low fabrication costs and continuous process improvements.

SUMMARY OF THE INVENTION

Optoelectronic devices of the present invention include several embodiments of an electronically active optical waveguide made of a strip loaded waveguide with a lateral, self aligned diode fabricated in a layer of silicon. A voltage applied across the diode changes the free carrier density in a portion of the active waveguide, which can change the refractive index in that portion of the waveguide. Changing the refractive index can cause a phase shift of an optical signal propagating down the waveguide and this effect can be used to control the optical signal. Changing the free carrier density can also change the amount of optical attenuation in a section of an active waveguide.

Optoelectronic devices such as: modulators, attenuators, switches, beam diverters, tunable filters and other devices can be fabricated on a standard SOI substrate (silicon on insulator), which is typically used in the fabrication of CMOS integrated circuits. Other types of substrates can also be used for the fabrication of optoelectronic devices of the present invention.

BRIEF DESCRIPTION OF THE DRAWINGS

FIG. 8 is a table summarizing the general characteristics of doped regions of a lateral diode, according to several embodiments of the present invention.

FIG. 9 is a table summarizing the doping characteristics of three types of lateral diodes, according to several embodiments of the present invention.

DETAILED DESCRIPTION

Figure 1:
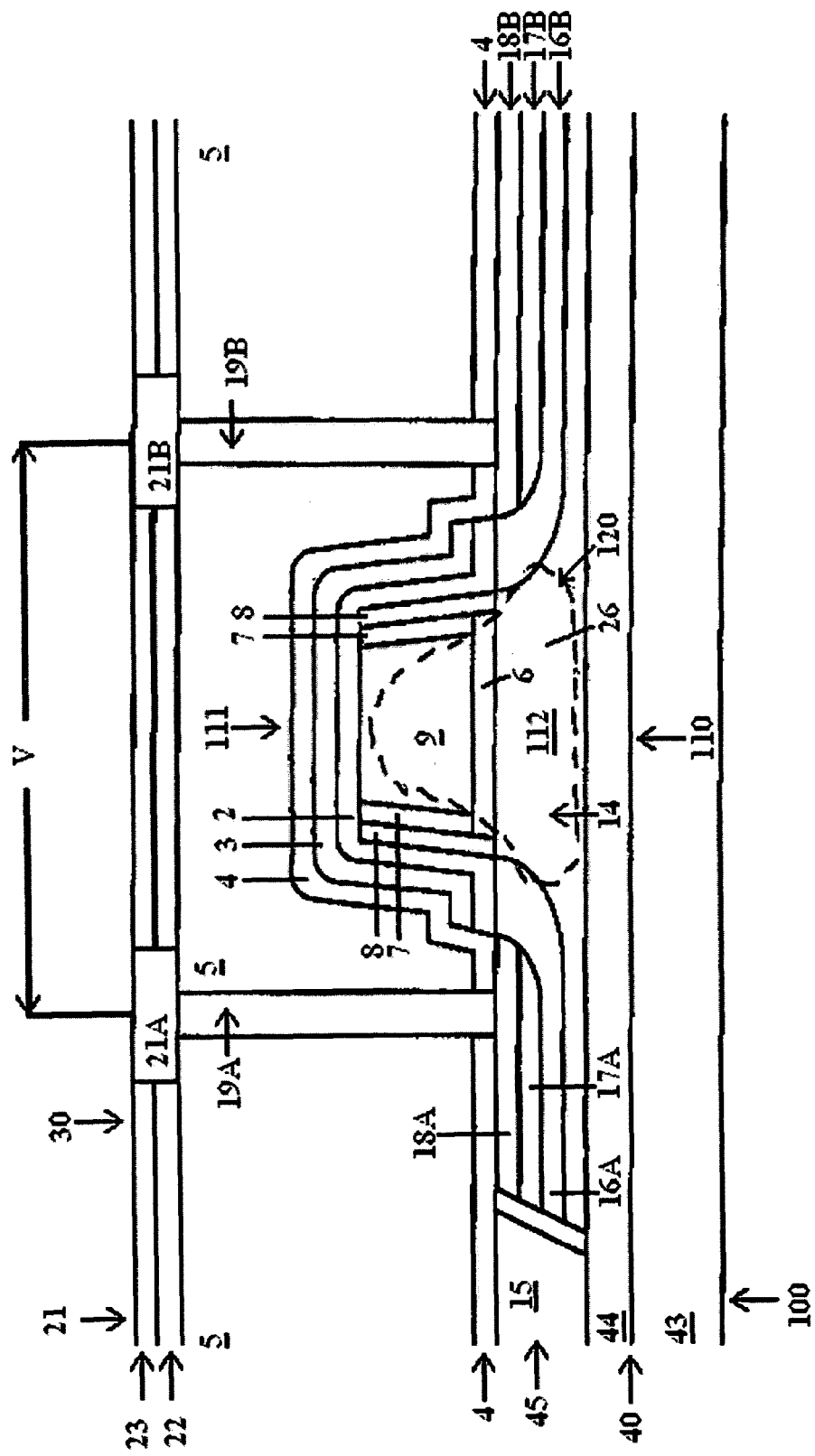
FIG. 1 is a cross sectional view of an active waveguide, according to an embodiment of the present invention.

FIG. 1 is a cross sectional view, not to scale, of an active waveguide, according to one embodiment of the present invention. Active waveguide 110 is part of integrated circuit 100, which has been fabricated on substrate 40. Substrate 40 is made of dielectric layer 44 and silicon layer 43. Dielectric layer 44 is typically made of silicon dioxide. On top of silicon dioxide layer 44 is silicon layer 45. Layers 45, 44 and 43 together form what is commonly referred to as a SOI (silicon on insulator) wafer, which is frequently used for the production of CMOS integrated circuits.

Active waveguide 110 includes core 111 and surrounding layers of cladding. The core 111 is made of silicon slab 112, dielectric layer 6 and polysilicon strip 9. The polysilicon strip 9 in a cross sectional view can have one of many possible shapes, such as those of a square, a rectangle, a trapezoid or other form. Horizontal confinement of the light propagating along the waveguide 110 is provided by polysilicon strip 9.

Silicon dioxide layer 44 functions as a bottom cladding for the core 111. On one side of silicon slab 112 are dielectric layers 1 and 15, which serve as side claddings. The sides of polysilicon strip 9 are covered by dielectric layers 7 and 8. Layers 1 and 7 are sidewall passivation layers, typically made of silicon dioxide. Layer 15 is field oxide, typically silicon dioxide. Layer 8 is a dielectric spacer, usually silicon dioxide.

On top of core 111 are dielectric layers 2, 3, 4 and 5, which function as cladding. Layer 2 is an oxide spacer layer of dielectric material, typically silicon dioxide. Layer 3 is a salicide blocking layer of dielectric material, typically silicon nitride. Layer 4 is a contact punch-through layer of dielectric material, which can be deposited from a mixture of silicon, oxygen and nitrogen. Layer 5 is an inter-level dielectric (ILD) which can be made of multiple layers of dielectric material. An ILD like layer 5 can be made of silicon dioxide, but preferably is of a low k dielectric, such as silicon carbon oxide.

Active waveguide 110 includes lateral diode 30 in slab 112 with electrical connections 18A and 18B, which terminate in respective doped regions 16A and 16B. Doped regions 16A and 16B, can either contain the same charge or be oppositely charged. Doped region 16A includes doped region 17A, which are both of the same polarity. Doped region 16B includes doped region 17B, which are both of the same polarity. Regions 16A and 16B receive medium density implants, which are similar to extension type implants typically made during the fabrication of a CMOS transistor. Regions 17A and 17B receive heavy density implants, which are similar to source/drain type implants typically made during the fabrication of a CMOS transistor.

Silicon slab 112 includes a light implant 13 of low density, which can be positively or negatively doped. Light implant 13 is similar to what is known as a well implant, typically made during the fabrication of a CMOS transistor. In alternate embodiments, silicon slab 112 does not include a light implant 13. After light implant 13 is made into silicon slab 112, then the dielectric layer 6 and polysilicon strip 9 can be disposed on top of silicon slab 112. After the fabrication of polysilicon strip 9, then regions 16A and 16B can be implanted using polysilicon strip 9 as a self aligned mask. Other layers of material can be deposited on the sides of polysilicon strip 9 to form a slightly wider self aligned mask, which can be used for the implanting of regions 17A and 17B.

Implanting a region with a light implant 13 will cause a dopant density level between 1e16 to 1e18 atoms/cm$^3$. Implanting a region with a medium implant, such as the kind implanted in regions 16A or 16B will cause a dopant density level between 1e17 to 1e19 atoms/cm$^3$. Implanting a region with a heavy implant, such as the kind implanted in regions 17A and 17B will cause a dopant density level greater than 1 e 19 atoms/cm$^3$.

After regions 16A and 16B are implanted into silicon slab 112, there is a region 14 in silicon slab 112, which is between regions 16A and 16B. Region 14 is part of the active region within the lateral diode 30 in slab 112. The size and shape of the active region within diode 30 is dependent on many factors, and among them are: the type of diode, the doping configuration of the diode, and the voltage applied to the diode.

Polysilicon strip 9 along with other layers deposited on its sides can be used as self aligned masks during the implantation of dopants. Such self aligned masks can define the inner boundaries of regions 16A, 16B, 17A and 17B. Region 26 in silicon slab 112 is a region under a self aligned mask, which receives minimal amounts of some implanted dopants.

A self aligned mask formed of polysilicon strip 9 and dielectric layers 7 and 8, as shown in FIG. 1, can be used during the implanting of regions 16A and 16B. Other layers of material, such as layers 2 and 3 in FIG. 1 deposited on the sides of polysilicon strip 9, form a slightly wider self aligned mask, which can be used, for example, for the implanting of regions 17A and 17B. More than one width of self aligned masks can be used during the fabrication of an active waveguide of the present invention.

It is also possible to use an external mask to define the boundaries of doped regions 16A, 16B, 17A and 17B during the implantation of dopants. An external mask along with an energy beam of suitable power can be used to deposit dopant underneath polysilicon strip 9 in silicon slab 112 or within some other buried layer of an optoelectronic integrated circuit. This type of implant can be referred to as a "through implant."

Ohmic contacts 18A and 18B, typically of cobalt silicide, are made into doped regions 16A and 16B of active waveguide 110. After the ohmic contacts 18A and 18B have been formed, dielectric layers 4 and 5 can be deposited. Passing through layers 4 and 5 are conductive plugs 19A and 19B, typically made of tungsten, which connect the ohmic contacts 18A and 18B to the metal segments 21A and 21B of the first metal layer 21. Contacts 18A and 18B provide electrical connections to lateral diode 30 formed in slab 112.

First metal layer 21 (M1) is typically made of copper and connects to the conductive plugs 19A and 19B from the active waveguide 110 and provides electrical connections to other circuits on integrated circuit 100. Insulating the metal segments from each other in first metal layer 21 are layers 22 and 23. Layer 22 is a contact punch-through layer made of dielectric material. Layer 23 is an inter-layer dielectric (ILD) spacer layer made of dielectric material, typically silicon dioxide or silicon carbon oxide. Integrated circuits typically have more than one metal layer, but for the purpose of simplifying the diagram, only one metal layer is shown in FIG. 1.

The fabrication of optoelectronic devices, including active waveguides is discussed in U.S. patent application Ser. No. 10/606,297 entitled "Integrated Optical And Electronic Devices" and filed Jun. 24, 2003 and incorporated herein by reference.

Active waveguide 110 can also be connected to other optoelectronic or electronic devices integrated on the same substrate by horizontal local interconnects, which can directly connect electrical contacts 18A and 18B with similar electrical contacts on those other devices.

Light propagating longitudinally down waveguide 110 will be mainly confined to the core 111, primarily in a single mode, due to the large difference in refractive indices between the core 111 and the surrounding claddings. The single mode distribution of light propagating in the core 111 is shown by dashed line 120, which shows that most of the power of the light in the waveguide 110 is primarily near to the center of the core 111. Dashed line 120 is an approximate illustration of the confinement of most of the power of the optical signal in the center of the core 111.

An optical signal longitudinally propagating down active waveguide 110 can be controlled by applying voltage V across lateral diode 30 using electrical contacts 21A and 21B and/or contacts 18A and 18B. Voltage V applied across lateral diode 30 in active waveguide 110 can change the free carrier density in the active region in diode 30 in waveguide 110, which can alter the refractive index within that region. Altering the refractive index as light propagates down active waveguide 110, can cause a phase shift in that light. Changing the free carrier density in the active region of the diode 30 can also alter the amount of optical attenuation of light passing through the active region in diode 30 in waveguide 110.

In order to minimize possible optical losses, it is preferable to position contacts 18A and 18B in respective regions 16A and 16B as far away from the optical mode profile as is feasible. In order to minimize the electrical resistance from contacts 18A and 18B to the active region in diode 30, the contacts should be as close to the active region as may be feasible.

Polysilicon strip 9 of waveguide 110 provides a way of controlling the light propagating down silicon slab 112, which can otherwise spread out in slab 112. An optical signal traveling down waveguide 110 can be confined to region 120 near to the center of waveguide core 111. The greater the overlap between the area of optical confinement in slab 112 and the active region in diode 30, the more effective a voltage V applied to diode 30 can be in controlling the optical signal traveling down waveguide 110. Some of the light traveling down waveguide 110 will pass through polysilicon strip 9, but the amount of light traveling through the active region can be maximized for highest efficiency in controlling the light passing through active waveguide 110.

Alternate embodiments of active waveguide 110 can be made by forming any one of several types of diodes 30: 30A, 30B and 30C that can be in active waveguide 110, depending on how slab 112 and regions 16A and 16B are doped. The specifics of the doping of these regions are discussed herein with regard to FIGS. 5, 6, 7, 8 and 9.

Causing a phase shift and/or attenuation in an optical signal propagating down active waveguide 110 can be utilized to implement various types of optoelectronic devices, such as: phase shifters, modulators, attenuators, switches, beam diverters, tunable filters and other devices. Any of these optoelectronic devices can be made through the design and configuration of active waveguide 110.

Active waveguide 110 operating as an optical phase shifter can be used as part of a Mach-Zehnder interferometer functioning as an optical intensity modulator. Active waveguide 110 operating as a variable attenuator can function as an adjustable loss element, and such a device is sometimes referred to as a VOA or Variable Optical Attenuator. Active waveguide 110 can be designed to function as a tunable filter by configuring the waveguide as a resonator.

Figure 2:
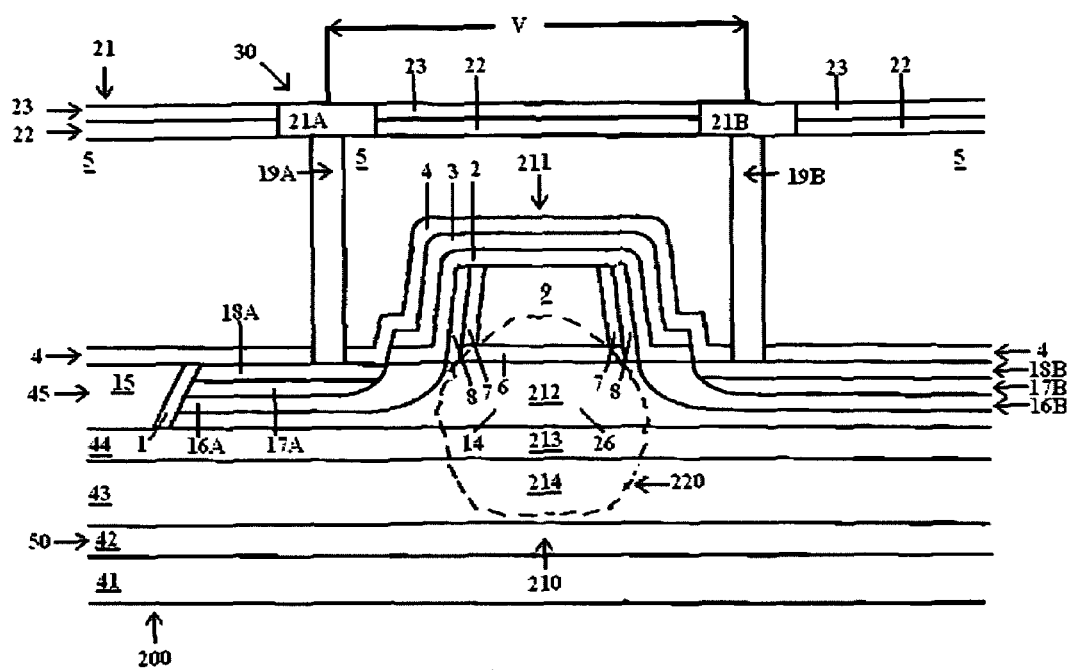
FIG. 2 is a cross sectional view of an active waveguide, according to an alternate embodiment of the present invention.

FIG. 2 is a cross sectional view, not to scale, of active waveguide 210, according to an alternate embodiment of the present invention. Active waveguide 210 is fabricated on integrated circuit 200, which is made on substrate 50. Substrate 50 is made of dielectric layer 52 and monocrystalline silicon layer 51. Waveguide 210 includes parts of layers 55, 54 and 53, which have been disposed on top of the substrate 50. Layer 55 is made of monocrystalline silicon. Layer 54 is a dielectric layer made of silicon dioxide. Layer 53 is made of monocrystalline silicon.

Layers 55, 54, 53 and substrate 50 together form a wafer, which can be used for the production of CMOS integrated circuits. Such a wafer can be used to form integrated optoelectronic and electronic devices using standard CMOS fabrication processes. Layer 55, as the topmost layer of silicon on a wafer can be used for the fabrication of integrated electronic devices Waveguide core 211 includes polysilicon strip 9, silicon dioxide layer 6, silicon slab 212, silicon dioxide layer 213 and silicon slab 214. Silicon slab 212 is part of layer 55 of integrated circuit 200. Silicon dioxide layer 213 and silicon slab 214 are respectively part of layers 54 and 53. Layer 52 of substrate 50 acts as the bottom cladding for waveguide 210.

The other similarly numbered elements of FIG. 2 are made of the same materials and provide the same functions as discussed with regard to FIG. 1.

Additional embodiments of active waveguide 210 can be made by forming any one of three types of diodes: 30A, 30B and 30C in active waveguide 210, as has been discussed with regard to active waveguide 110 in FIG. 1 and is discussed with regard to FIGS. 5, 6, 7, 8 and 9.

Waveguide 210 can have an optical mode profile as outlined by dashed line 220, which shows that the amount of light traveling through polysilicon strip 9 has been diminished, as compared to waveguide 110 shown in FIG. 1. The center of the optical mode has shifted down relative to where it was for waveguide 110 in FIG. 1. A particularly advantageous aspect of active waveguide 210, as compared to waveguide 110, is the decreased amount of optical power lost in polysilicon strip 9.

The operation of active waveguide 210 is similar to the operation of active waveguide 110. An optical signal longitudinally propagating down active waveguide 210 can be controlled by applying voltage V across lateral diode 30 using electrical contacts 21A and 21B and/or 18A and 18B. Voltage V applied across lateral diode 30 in active waveguide 210 can change the free carrier density in the active region of diode 30 in waveguide 210, which can alter the refractive index within that region. Altering the refractive index as light propagates through active waveguide 210, can cause a phase shift in that light. Changing the free carrier density in the active region can also change the optical attenuation of that light.

Causing a phase shift and/or attenuation in an optical signal propagating down active waveguide 210 can be utilized to implement various types of optoelectronic devices, such as: phase shifters, modulators, attenuators, switches, beam diverters, tunable filters and other devices. Any of these optoelectronic devices can be made through the design and configuration of active waveguide 210.

Figure 3:
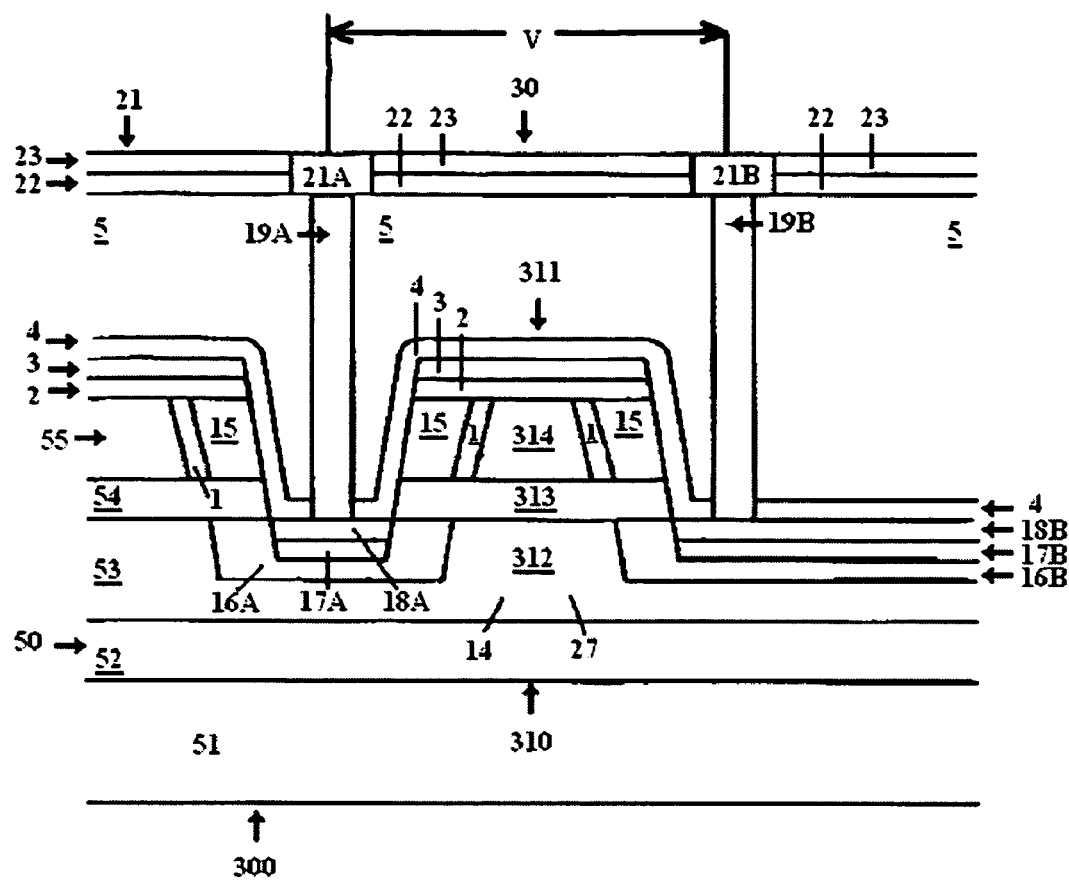
FIG. 3 is a cross sectional view of an active waveguide, according to another embodiment of the present invention.

FIG. 3 is a cross sectional view, not to scale, of an active waveguide 310, according to another embodiment of the present invention. Active waveguide 310 is part of integrated circuit 300, which has been fabricated on substrate 50. Substrate 50 is the same type of substrate as discussed with regard to FIG. 2. Waveguide 310 is made of core 311 and surrounding layers of cladding. Core 311 is made of silicon slab 312, dielectric layer 313 and silicon strip 314. The silicon strip 314 in a cross sectional view can have one of many possible shapes, such as those of a square, a rectangle, a trapezoid or other form.

The other similarly numbered elements of FIG. 3 are made of the same materials and provide the same functions as discussed with regard to FIG. 1, except that waveguide 310 does not include a region 26, but has a region 27 in slab 312.

Silicon strip 314 along with other layers deposited on its sides can be used as self aligned masks during the implantation of dopants. Region 27 in silicon slab 312 is a region under the self aligned mask made of silicon strip 314 which receives minimal amounts of some implanted dopants.

Self aligned masks can define the inner boundaries of regions 16A, 16B, 17A and 17B. A self aligned mask formed of silicon strip 314 and dielectric layer 1, as shown in FIG. 3, is an example of a self aligned mask used during the implanting of regions 16A and 16B. Other layers of material, such as layer 15 in FIG. 3, deposited on the sides of silicon strip 314, form a slightly wider self aligned mask, which can be used, for example, for the implanting of regions 17A and 17B. More than one width of self aligned masks can be used during the fabrication of an active waveguide of the present invention.

It is also possible to use an external mask to define the boundaries of doped regions during the implantation of dopants. An external mask along with an energy beam of suitable power can be used to deposit dopant underneath silicon strip 314 in silicon slab 312 or within some other buried layer of an optoelectronic integrated circuit. This type of implant can be referred to as a "through implant."

A particularly advantageous aspect of this invention is the implanting of dopant into buried silicon layer 312, which provides the ability to fabricate a diode in a buried layer of an optoelectronic integrated circuit.

Additional embodiments of active waveguide 310 can be made by forming any one of three types of diodes: 30A, 30B and 30C in active waveguide 310, as has been discussed with regard to active waveguide 110 in FIG. 1.

Horizontal optical confinement is provided by silicon strip 314, which limits the width of the optical mode in layers 312 and 313 of core 311. A particularly advantageous aspect of this embodiment is that the width of the silicon strip 314 can be designed to increase the confinement factor in the active region of diode 30 while minimizing the amount of optical loss in strip 314.

The operation of active waveguide 310 is similar to the operation of active waveguide 110. An optical signal longitudinally propagating down active waveguide 310 can be controlled by applying voltage V across lateral diode 30 using electrical contacts 21A and 21B and/or 18A and 18B. Voltage V applied across the lateral diode 30 in active waveguide 310 can change the free carrier density in the active region of diode 30 in waveguide 310, which can alter the refractive index within that region. Altering the refractive index as light propagates through active waveguide 310, can cause a phase shift in that light. Changing the free carrier density in the active region of diode 30 can also change the optical attenuation of that light.

Causing a phase shift and/or attenuation in an optical signal propagating down active waveguide 310 can be utilized to implement various types of optoelectronic devices, such as: phase shifters, modulators, attenuators, switches, beam diverters, tunable filters and other devices. Any of these optoelectronic devices can be made through the design and configuration of active waveguide 310.

Figure 4:
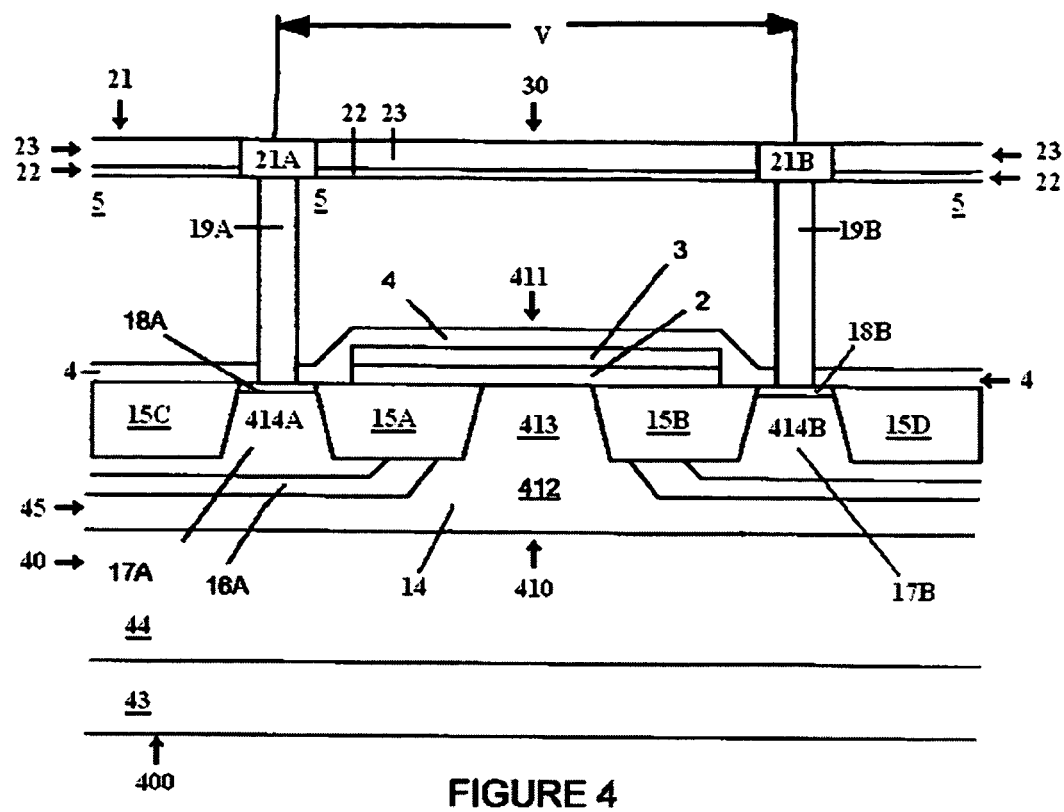
FIG. 4 is a cross sectional view of an active waveguide, according to an alternate embodiment of the present invention.

FIG. 4 is a cross sectional view, not to scale, of an active rib waveguide, according to one embodiment of the present invention. Active waveguide 410 is part of integrated circuit 400, which has been fabricated on substrate 40. Substrate 40 is the same type of substrate as is shown in FIG. 1. On top of core 411 are dielectric layers 2, 3, 4 and 5, which function as cladding.

Core 411 of active waveguide 410 is made of silicon slab 412, silicon rib 413, and silicon sections 414A, 414B. Silicon rib 413 in a cross sectional view can have one of many possible shapes, such as those of a square, a rectangle, a trapezoid or other form. Horizontal confinement of the light propagating along the waveguide 410 is provided by silicon rib 413.

Silicon rib 413 has two sections of dielectric 15A and 15B, on either side of it, which separate the rib 413 from silicon sections 414A and 414B. Silicon sections 414A and 414B are separated from the rest of the integrated circuit 400 by additional sections of dielectric 15C and 15D. In some embodiments, silicon sections 414A and 414B can be at approximately the same height as the top of the silicon rib 413. In other embodiments, the top of sections 414A and 414B can be higher or lower than the top of silicon rib 413. Dielectric sections 15A, 15B, 15C and 15D are typically formed of field oxide, such as silicon dioxide.

The other similarly numbered elements of FIG. 4 are made of the same materials and provide the same functions as discussed with regard to FIG. 1.

Additional embodiments of active waveguide 410 can be made by forming any one of three types of diodes: 30A, 30B and 30C in active waveguide 410, as discussed with regard to active waveguide 110 in FIG. 1.

A particularly advantageous aspect of these embodiments is the positioning of electrical contacts 18A and 18B sufficiently far away from the active region of diode 30 in the waveguide core 411 so as to not affect the propagation of light through the core, but still have suitable electrical connections to doped regions 16A and 16B to provide for high speed operation of the active waveguide 410.

The operation of active waveguide 410 is similar to the operation of active waveguide 110. An optical signal longitudinally propagating down active waveguide 410 can be controlled by applying voltage V across lateral diode 30 using electrical contacts 21A and 21B and/or 18A and 18B. Voltage V applied across the lateral diode 30 in active waveguide 410 can change the free carrier density in the active region of diode 30 in the silicon slab 412 in waveguide 410, which can alter the refractive index within that region. Altering the refractive index as light propagates through active waveguide 410, can cause a phase shift in that light. Changing the free carrier density in the active region can also alter the optical attenuation in that region of waveguide 410.

Causing a phase shift and/or attenuation in an optical signal propagating down active waveguide 410 can be utilized to implement various types of optoelectronic devices, such as: phase shifters, modulators, attenuators, switches, beam diverters, tunable filters and other devices. Any of these optoelectronic devices can be made through the design and configuration of active waveguide 410.

Figure 5:
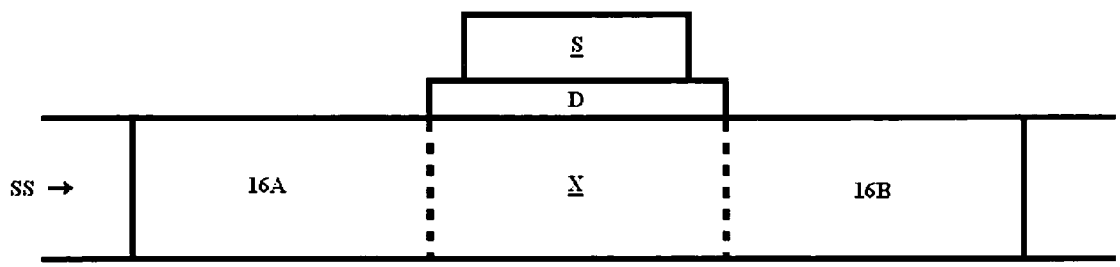
FIG. 5 is a cross sectional view of a lateral diode, according to several embodiments of the present invention.

FIG. 5 is a cross sectional view of lateral diode 30, not to scale, according to the various embodiments of FIGS. 1, 2 and 3 of the present invention. A silicon slab SS includes doping regions 16A and 16B and region X. Region X is underneath strip S and silicon dioxide layer D.

With respect to FIG. 5, waveguide 110 of FIG. 1 will have silicon slab SS=112, silicon dioxide layer D=gate oxide 6, strip S=polysilicon 9 and region X=region 26. Any of the embodiments of lateral diode 30: 30A, 30B and 30C can be formed in waveguide 110 of FIG. 1. Region 26 is the region under polysilicon strip 9, which is not penetrated by an energy beam implanting dopant into silicon slab 112, due to polysilicon strip 9 acting as a self aligned mask.

With respect to FIG. 5, waveguide 210 of FIG. 2 will have silicon slab SS=212, silicon dioxide layer D=gate oxide 6, strip S=polysilicon 9 and region X=region 26. Any of the embodiments of lateral diode 30: 30A, 30B and 30C can be formed in waveguide 210 of FIG. 2. Region 26 is the region under polysilicon strip 9, which is not penetrated by an energy beam implanting dopant into silicon slab 212, due to polysilicon strip 9 acting as a self aligned mask.

In the fabrication of waveguides 110 and 210, when regions 16A and 16B are implanted, polysilicon strip 9 blocks dopants from region 26 of the silicon slab 112 or 212. Polysilicon strip 9 acts as a self aligned mask with regard to the doping of regions 16A and 16B. An external mask can also be used to define the boundaries of doped regions 16A and 16B in waveguides 110 and 210.

With respect to FIG. 5, waveguide 310 of FIG. 3 has silicon slab SS=312, silicon dioxide layer D=silicon dioxide 313, strip S= silicon 314 and region X=region 27. Any of the embodiments of lateral diode 30: 30A, 30B and 30C can be formed in waveguide 310 of FIG. 3.

Region 27 is the region under silicon strip 314, which is not penetrated by an energy beam implanting dopants 16A, 16B, 17A or 17B into regions 16A and 16B in silicon slab 312. The self aligned (SA) mask used in the fabrication of waveguide 310 can be of various widths. The SA mask is at least the width of the silicon strip 314. The width of the SA mask can also be equal to the combination of the silicon strip 314 and the two sidewall passivation layers 1. The width of the SA mask can also be as wide as the combination of the silicon strip 314, the two sidewall passivation layers 1 and the two sections of field oxide 15 in FIG. 3. Thus the width of region 27 will depend on the width of the SA mask used during the process of doping the silicon slab. An external mask can also be used to define the boundaries of doped regions 16A and 16B during the fabrication of waveguide 310.

Figure 6:
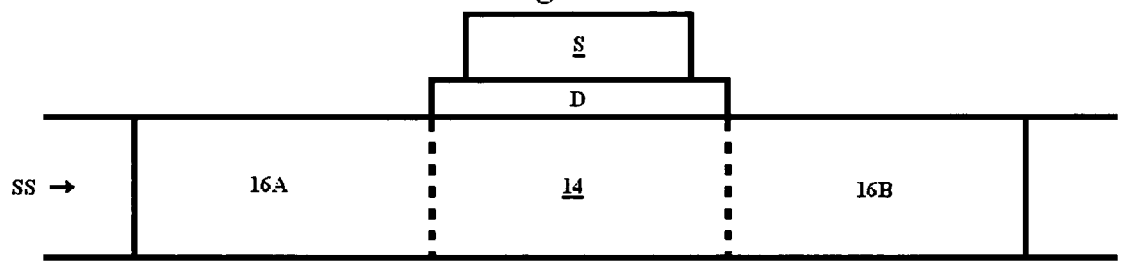
FIG. 6 is a cross sectional view of a lateral diode, according to several embodiments of the present invention.

FIG. 6 is a cross sectional view of lateral diode 30, not to scale, according to the embodiments of FIGS. 1, 2 and 3 of the present invention, and with regard to region 14. Silicon slab SS includes doping regions 16A and 16B and region 14. Region 14 is underneath strip S and silicon dioxide layer D, but it may not be the same width as region X in FIG. 5.

Region 14 is the region between doping regions 16A and 16B. Region 14 may or may not be doped, depending on the type of lateral diode that is formed in a waveguide. The table in FIG. 9 shows the doping configuration needed to form each of the lateral diodes 30A, 30B and 30C.

The size and shape of the active region within diode 30 is dependent on many factors, and among them are: the type of diode, the doping configuration of the diode, and the voltage applied to the diode.

With respect to FIG. 6, waveguide 110 of FIG. 1 has the following elements: silicon slab SS is made of slab 112, dielectric layer D is made of gate oxide layer 6 and strip S is made of polysilicon strip 9.

With respect to FIG. 6, waveguide 210 of FIG. 2 has the following elements: silicon slab SS is made of slab 212, dielectric layer D is made of gate oxide layer 6 and strip S is made of polysilicon strip 9.

With respect to FIG. 6, waveguide 310 of FIG. 3 has the following elements: silicon slab SS is made of slab 312, dielectric layer D is made of silicon dioxide layer 313 and strip S is made of silicon strip 314.

Figure 7:
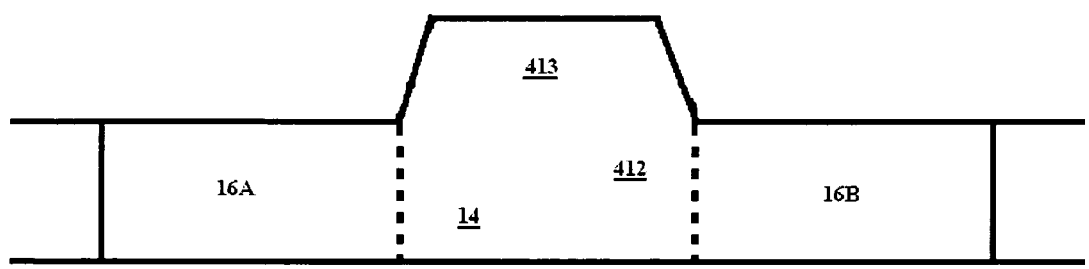
FIG. 7 is a cross sectional view of a lateral diode, according to several embodiments of the present invention.

FIG. 7 is a cross sectional view of lateral diode 30, not to scale, according to the waveguides of FIG. 4 of the present invention, and with regard to region 14. Silicon slab 412 includes rib 413, doped regions 16A and 16B and region 14. Due to the typical fabrication process steps used to make waveguide 410, silicon rib 413 does not function as a self aligned mask, and as a result an external mask is typically used to implant the doped regions 16A and 16B.

Region 14 is the region between doping regions 16A and 16B. As was discussed with regard to FIG. 6, region 14 may or may not be doped, depending on the type of lateral diode that is formed in waveguide 410, which is specified in the table in FIG. 9.

The size and shape of the active region within diode 30 is dependent on many factors, and among them are: the type of diode, the doping configuration of the diode, and the voltage applied to the diode.

FIG. 8 is a table summarizing the general characteristics of doped regions of a lateral diode, according to several embodiments of the present invention. The silicon slab in the waveguides of FIGS. 1, 2, 3 and 4, if it is implanted receives a light implant 13 and implantation typically takes place without a mask.

Regions 16A and 16B receive a medium density implant. Regions 17A and 17B receive a heavy or high density implant. Region 16A has the same polarity as 17A and is larger than region 17A. Region 16B has the same polarity as 17B and is larger than region 17B. Regions 16A, 16B, 17A and 17B in waveguides 110, 210 and 310 in respective FIGS. 1, 2 and 3 can be implanted using either a self aligned mask made of the strip above the layer receiving the implantations or with an external mask. Regions 16A, 16B, 17A and 17B in waveguide 410 in FIG. 4 can be implanted using an external mask.

FIG. 9 is a table summarizing the doping characteristics of three types of lateral diodes: 30A, 30B and 30C, that can be formed in any of the waveguides of FIGS. 1, 2, 3 and 4, according to several embodiments of the present invention.

The silicon slab of a PIN diode 30A does not receive a light implant. The polarities of the doped regions is: 16A=17A≠16B=17B. The silicon slab of a P/N-/N diode 30B is preferably N doped. The polarities of the doped regions 16A, 17A, 16B and 17B are the same as for a PIN diode.

The silicon slab of a (drain induced barrier lowering) diode 30C can be N or P type. The polarities of the doped regions are: 14≠16A=17A=16B=17B. Applying a high voltage to either contact 18A or 18B can cause a DIBL effect, which can invert region 14 and cause carrier density change.

Figure 10:
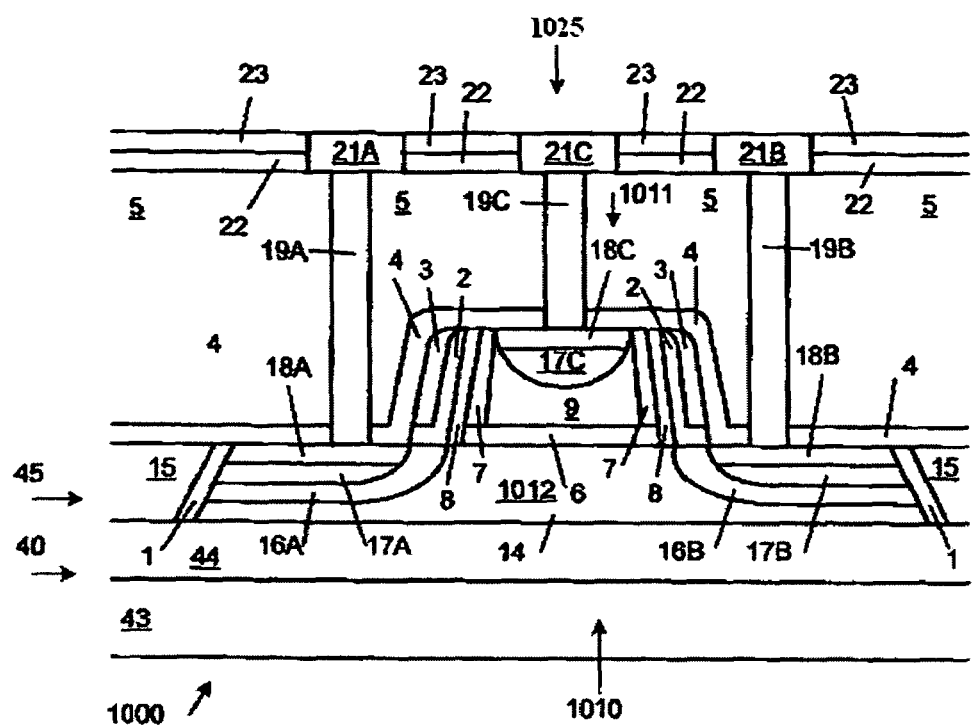
FIG. 10 is a cross sectional view of an active waveguide, according to another embodiment of the present invention.

FIG. 10 is a cross sectional view, not to scale, of an active waveguide, according to one embodiment of the present invention. Active waveguide 1010 is part of integrated circuit 1000, which has been fabricated on substrate 40. Substrate 40 is the same type of substrate as is shown in FIG. 1. On top of core 1011 are multiple dielectric layers, not shown, which function as cladding. Silicon dioxide layer 44 functions as a bottom cladding for the core 1011.

Active waveguide 1010 includes core 1011 and surrounding layers of cladding. The core 1011 is made of silicon slab 1012, dielectric layer 6 and polysilicon strip 9. Horizontal confinement of the light propagating down the waveguide 1010 is provided by polysilicon strip 9.

Active waveguide 1010 includes MOSFET transistor 1025. Doped regions 16A and 16B are separated by region 14. The active region of CMOS transistor 1025 can include part of region 14, but can be larger or smaller depending on the specific combination of dopants and applied voltages. Silicon slab 1012 can include a well implant, such as light implant 13. Regions 16A and 16B receive extension implants, which are of medium density. Regions 17A, 17B and 17C receive source/drain/gate type implants, which are of heavy density. Polysilicon gate 9 receives implant 17C. Region 17A is typically within region 16A and region 17B is typically within region 16B. Regions 16A, 16B, 17A, 17B and 17C are all of the same charge and oppositely charged to the light implant 13 in silicon slab 1012.

Electrical contacts 18A and 18B are made in respective regions 16A and 16B and function as the source and drain contacts for transistor 1025. Electrical contact 18C is made in the doped region 17C and functions as a gate contact for transistor 1025. Conductive plugs 19A, 19B and 19C connect the ohmic contacts 18A, 18B and 18C to the metal segments 21A, 21B and 21C of the first metal layer 21. The other similarly numbered elements of FIG. 10 are made of the same materials and provide the same functions as discussed with regard to FIG. 1.

A voltage or combination of voltages can be applied to one or more of the three terminals of transistor 1025 to cause a change in free carrier density within the active region of transistor 1025. The active region can undergo a change in refractive index and/or optical attenuation. A change in refractive index can cause phase shift in an optical signal propagating down waveguide 1010 and through transistor 1025.

Causing a phase shift and/or attenuation in an optical signal propagating down active waveguide 1010 can be utilized to implement various types of optoelectronic devices, such as: phase shifters, modulators, attenuators, switches, beam diverters, tunable filters and other devices. Any of these optoelectronic devices can be made through the design and configuration of active waveguide 1010.

Figure 11:
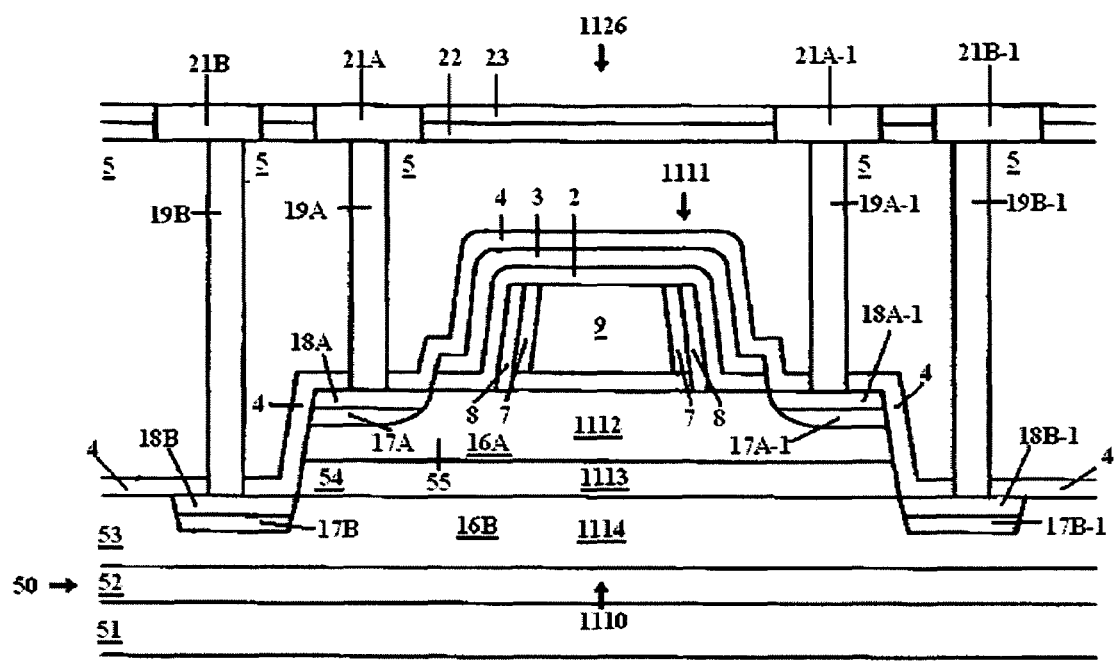
FIG. 11 is a cross sectional view of an active waveguide, according to an alternate embodiment of the present invention.

FIG. 11 is a cross sectional view, not to scale, of an active waveguide, according to an alternate embodiment of the present invention. Active waveguide 1110 is part of integrated circuit 1100, which has been fabricated on substrate 50. Substrate 50 is the same type of substrate as was discussed with regard to FIG. 2. Waveguide 1110 is made of core 1111 and surrounding layers of cladding, which are not shown.

Waveguide core 1111 includes polysilicon strip 9, silicon dioxide layer 6, silicon slab 1112, silicon dioxide layer 1113 and silicon slab 1114. Silicon slab 1112, silicon dioxide layer 1113 and silicon slab 1114 are respectively part of layers 55, 54 and 53. Layer 52 of substrate 50 acts as the bottom cladding for waveguide 1110. Horizontal confinement of the light propagating along the waveguide 1110 is provided by polysilicon strip 9.

Active waveguide 1110 includes buried vertical capacitor 1126 formed by silicon slabs 1112 and 1114 and dielectric layer 1113 between them. Silicon slab 1112 includes doped region 16A, 16A-1, 17A and 17A-1. Silicon slab 1114 includes doped region 16B, 16B-1, 17B and 17B-1. Silicon slabs 1112 and 1114 can also be doped with light dopant 13. Silicon slabs 1112 and 1114 can be doped with the same or oppositely charged dopants. Silicon slab 1112 contains multiple electrical contacts 18A and 18A-1. Silicon slab 1114 contains multiple electrical contacts 18B and 18B-1. Conductive plugs 19A, 19A-1, 19B and 19B-1 connect the respective ohmic contacts 18A, 18A-1, 18B and 18B-1 to the respective metal segments 21A, 21A-1 21B and 21B-1 of the first metal layer 21.

The other similarly numbered elements of FIG. 11 are made of the same materials and provide the same functions as discussed with regard to FIG. 1.

There is an active region in the core of waveguide 1111, which can be on either one or both sides of dielectric layer 1113, but its location and extent are dependent on the specific combination of dopants and applied voltages.

Silicon slabs 1112 and 1114 can be considered as upper and lower plates of capacitor 1126. A voltage applied across the plates or slabs 1112 and 1114 of capacitor 1126 can "charge" the capacitor and introduce free charges into both slabs. This change in free carrier density can change the refractive indices and/or the optical attenuation in the two slabs 1112 and 1114, and thus be usable in the operation of various optoelectronic devices. A change in refractive index can cause phase shift in an optical signal propagating down waveguide 1110 and through capacitor 1126.

Causing a phase shift and/or attenuation in an optical signal propagating down active waveguide 1110 can be utilized to implement various types of optoelectronic devices, such as: phase shifters, modulators, attenuators, switches, beam diverters, tunable filters and other devices. Any of these optoelectronic devices can be made through the design and configuration of active waveguide 1110.

Although the present invention has been described in detail, it should be understood that various changes, substitutions and alterations can be made without departing from the spirit and scope of the invention as defined herein. The embodiments described above are to be considered in all respects as illustrative only and not restrictive in any manner.

We claim:

1. An optoelectronic device on a substrate comprising:
 a rib waveguide comprising:
  a slab of monocrystalline silicon on the substrate,
  a silicon rib formed on the slab of monocrystalline silicon,
  a first region of silicon formed on the slab of monocrystalline silicon along a first side of the rib, separated from the rib by a first region of dielectric,
  a second region of silicon formed on the slab of monocrystalline silicon along a second side of the rib, separated from the rib by a second region of dielectric,
  a plurality of doped regions in the slab of monocrystalline silicon, where a first and second doped region of the plurality of doped regions each respectively include the first and second regions of silicon, and
  a plurality of electrical contacts, where at least first and second electrical contacts are formed in respective first and second regions of silicon.

2. The optoelectronic device of claim 1, and further comprising the coupling of an electrical signal to at least one of the plurality of electrical contacts,
 where the electrical signal can change the free carrier density within a region in the slab of monocrystalline silicon.

3. The optoelectronic device of claim 2, wherein changing the free carrier density in a region can change the refractive index within the region in the slab of monocrystalline silicon.

4. The optoelectronic device of claim 3, wherein changing the refractive index within a region in the slab of monocrystalline silicon can cause a phase shift in an optical signal propagating through the region in the slab of monocrystalline silicon.

5. The optoelectronic device of claim 2, wherein changing the free carrier density within a region in the slab of monocrystalline silicon can change the attenuation of an optical signal propagating through the slab of monocrystalline silicon.

6. The optoelectronic device of claim 2, wherein the region of change in free carrier density comprises an active region in the slab of monocrystalline silicon.

7. The optoelectronic device of claim 1, and further comprising a third doped region in the slab of monocrystalline silicon.

8. The optoelectronic device of claim 7, wherein the second doped region is oppositely charged to the first doped region.

9. The optoelectronic device of claim 8, wherein the optoelectronic device comprises an active waveguide with a P/N$^-$/N diode.

10. The optoelectronic device of claim 1, wherein first and second doped regions of the plurality of doped regions are oppositely charged.

11. The optoelectronic device of claim 10, wherein the optoelectronic device comprises an active waveguide with a PIN diode.

12. The optoelectronic device of claim 1, and further comprising a third doped region in the slab of monocrystalline silicon, where the third doped region is oppositely charged to the first and second doped regions.

13. The optoelectronic device of claim 12, wherein the optoelectronic device comprises an active waveguide with a drain induced barrier lowering (DIBL) diode.

14. The optoelectronic device of claim 1, and further comprising the use of an implantation beam for depositing dopant into at least one of the plurality of doped regions, where the energy level of the implantation beam is controlled to deposit a dopant into a selected layer of the waveguide.

15. The optoelectronic device of claim 14, wherein at least one doped region in the slab of monocrystalline silicon is formed by the implantation of dopant into the slab of monocrystalline silicon.

16. The optoelectronic device of claim 1, wherein the substrate is selected out of a group comprised of:

a layer of silicon dioxide disposed on a layer of monocrystalline silicon,
a layer of sapphire, and
an air filled cavity.

17. The optoelectronic device of claim 1, wherein the layer of dielectric material is comprised of silicon dioxide.

18. The optoelectronic device of claim 1, and further comprising the longitudinal propagation of an optical signal through substantially the central section of the waveguide,
where the central section of the waveguide guides the substantial majority of the power of the optical signal propagating down the waveguide and
where each of the plurality of electrical contacts are formed not in proximity to the central section of the waveguide.

19. The optoelectronic device of claim 1, wherein each of the plurality of electrical contacts is comprised of an ohmic contact.

20. The optoelectronic device of claim 1, and further comprising at least one conductive plug coupling one of the plurality of electrical contacts to at least one of a plurality of metal layers of an integrated circuit.

21. The optoelectronic device of claim 1, and further comprising at least one local interconnection for coupling an electrical contact on the slab of monocrystalline silicon with an electrical contact on a device formed on the substrate.

22. The optoelectronic device of claim 1, wherein at least one of the plurality of electrical contacts is coupled to a device formed on the substrate and where the device is selected from the group comprising: a CMOS transistor, a BiCMOS transistor, a bipolar junction transistor (BJT), a junction FET (JFET) transistor, a diode, a resistor, a capacitor and an inductor.

23. The optoelectronic device of claim 1, wherein at least one doped region in the slab of monocrystalline silicon is formed by an implantation of dopant into the slab of monocrystalline silicon,
where the strip of polysilicon substantially blocks the implanting of dopant into a region of monocrystalline silicon substantially underneath the polysilicon strip.

* * * * *